US010996680B2

(12) United States Patent
Kashi et al.

(10) Patent No.: US 10,996,680 B2
(45) Date of Patent: May 4, 2021

(54) ENVIRONMENTAL PERCEPTION IN AUTONOMOUS DRIVING USING CAPTURED AUDIO

(71) Applicant: Mentor Graphics Corporation, Wilsonville, OR (US)

(72) Inventors: Amin Kashi, Sunnyvale, CA (US); Glenn Perry, Oakland, CA (US); Ohad Barak, Fremont, CA (US); Nizar Sallem, Menlo Park, CA (US)

(73) Assignee: Siemens Industry Software Inc., Plano, TX (US)

( * ) Notice: Subject to any disclaimer, the term of this patent is extended or adjusted under 35 U.S.C. 154(b) by 198 days.

(21) Appl. No.: 16/237,365

(22) Filed: Dec. 31, 2018

(65) Prior Publication Data

US 2020/0209882 A1 Jul. 2, 2020

(51) Int. Cl.
*G05D 1/02* (2020.01)
*G01S 15/931* (2020.01)
*G07C 5/08* (2006.01)
*G10K 11/178* (2006.01)
*G06K 9/00* (2006.01)

(52) U.S. Cl.
CPC .......... *G05D 1/0255* (2013.01); *G01S 15/931* (2013.01); *G06K 9/00805* (2013.01); *G07C 5/0808* (2013.01); *G10K 11/178* (2013.01); *G05D 2201/0213* (2013.01)

(58) Field of Classification Search
CPC .......... G05D 1/0255; G05D 2201/0213; G01S 15/931; G06K 9/00805; G07C 5/0808; G10K 11/178
See application file for complete search history.

(56) References Cited

U.S. PATENT DOCUMENTS

2019/0114489 A1* 4/2019 Jackson ............... G06K 9/6289

OTHER PUBLICATIONS

Baofend Guo, "Acoustic Information Fusion for Ground Vehicle Classification", Jul. 2008, all pages, retrieved from https://www.researchgate.net/publication/4368148_Acoustic_Information_Fusion_for_Ground_Vehicle_Classification (Year: 2008).*

\* cited by examiner

*Primary Examiner* — Calvin Cheung

(57) ABSTRACT

This application discloses sensors to capture audio measurement in an environment around a vehicle and a computing system to classify audio measurements captured with one or more sensors mounted to a vehicle, wherein the classified audio measurements identify to a type of object in an environment around the vehicle, and fuse the classified audio measurements with measurements captured by at least one different type of sensor to detect the object in the environment around the vehicle, wherein a control system for the vehicle is configured to control operation of the vehicle based, at least in part, on the detected object. The computing system can also identify noise in the captured audio measurements originating from the vehicle and utilize the identified noise to detect faults in the vehicle, to perform proximity detection around the vehicle, or to perform noise cancelation operations in the vehicle.

17 Claims, 9 Drawing Sheets

ENVIRONMENTAL PERCEPTION IN AUTONOMOUS DRIVING USING CAPTURED AUDIO

TECHNICAL FIELD

This application is generally related to automated driving and assistance systems and, more specifically, to environmental perception in autonomous driving systems using captured audio.

BACKGROUND

Many modern vehicles include built-in advanced driver assistance systems (ADAS) to provide automated safety and/or assisted driving functionality. For example, these advanced driver assistance systems can implement adaptive cruise control, automatic parking, automated braking, blind spot monitoring, collision avoidance, driver drowsiness detection, lane departure warning, or the like. The next generation of vehicles can include autonomous driving (AD) systems to control and navigate the vehicles independent of human interaction.

These vehicles typically include multiple sensors, such as one or more cameras, Light Detection and Ranging (Lidar) sensor, Radio Detection and Ranging (Radar) system, or the like, to measure different portions of the environment around the vehicles. Each sensor processes their own measurements captured over time to detect an object within their field of view, and then provide a list of detected objects to the advanced driver assistance systems or the autonomous driving systems for their use in implementing automated safety and/or driving functionality. In some instances, the sensors can also provide a confidence level corresponding to their detection of objects on the list based on their captured measurements.

The advanced driver assistance systems or the autonomous driving systems can utilize the list of objects and, in some cases, the associated confidence levels of their detection, to implement automated safety and/or driving functionality. For example, when a radar sensor in the front of a vehicle provides the advanced driver assistance system in the vehicle a list having an object in a current path of the vehicle, the advanced driver assistance system can provide a warning to the driver of the vehicle or control the vehicle in order to avoid a collision with the object.

In many instances, different types of objects may appear similar to the various sensors, such as a bicycle and a motorcycle, which can lead the sensors to either lower a confidence level corresponding to the detection or to delay output of an ambiguous object to the advanced driver assistance system until the difference has been ascertained via movement tracking. The sensors may also have their field of view completely or partially blocked by other objects in the environment around the vehicle, such as buildings, other vehicles, transportation infrastructure, or the like. These blind spots of the sensors may lead to vulnerabilities or vehicle collisions when moving objects become visible to the sensors, since the ADAS system may not have sufficient time to react to a sudden appearance of the objects.

SUMMARY

This application discloses a computing system to implement environmental perception using captured audio in driver assistance systems and/or automated driving systems of a vehicle. The vehicle implementing the driver assistance systems and/or the automated driving systems can include sensors to capture audio measurements in an environment around the vehicle. The vehicle can also include a computing system to classify audio measurements captured with one or more sensors mounted to a vehicle. The classified audio measurements can identify the type of objects in an environment around the vehicle. The computing system in the vehicle can utilize the classified audio measurements to detect the object in the environment around the vehicle. For example, the computing system can fuse the classified audio measurements with measurements captured by at least one different type of sensor to detect the object in the environment around the vehicle. The vehicle can include a control system to control operation of the vehicle based, at least in part, on the detected object. In another example, when the computing system determines that the type of object associated with the classified captured audio measurements is not visible to non-audio capturing sensors, the control system for the vehicle can control operation of the vehicle based, at least in part, on the type of object associated with the classified captured audio measurements. The computing system in the vehicle can also identify noise in the captured audio measurements originating from the vehicle and utilize the identified noise to detect faults in the vehicle, to perform proximity detection around the vehicle, or to perform noise cancelation operations in the vehicle. Embodiments will be described below in greater detail.

DETAILED DESCRIPTION

Sensor Fusion for Autonomous Driving

Figure 1:
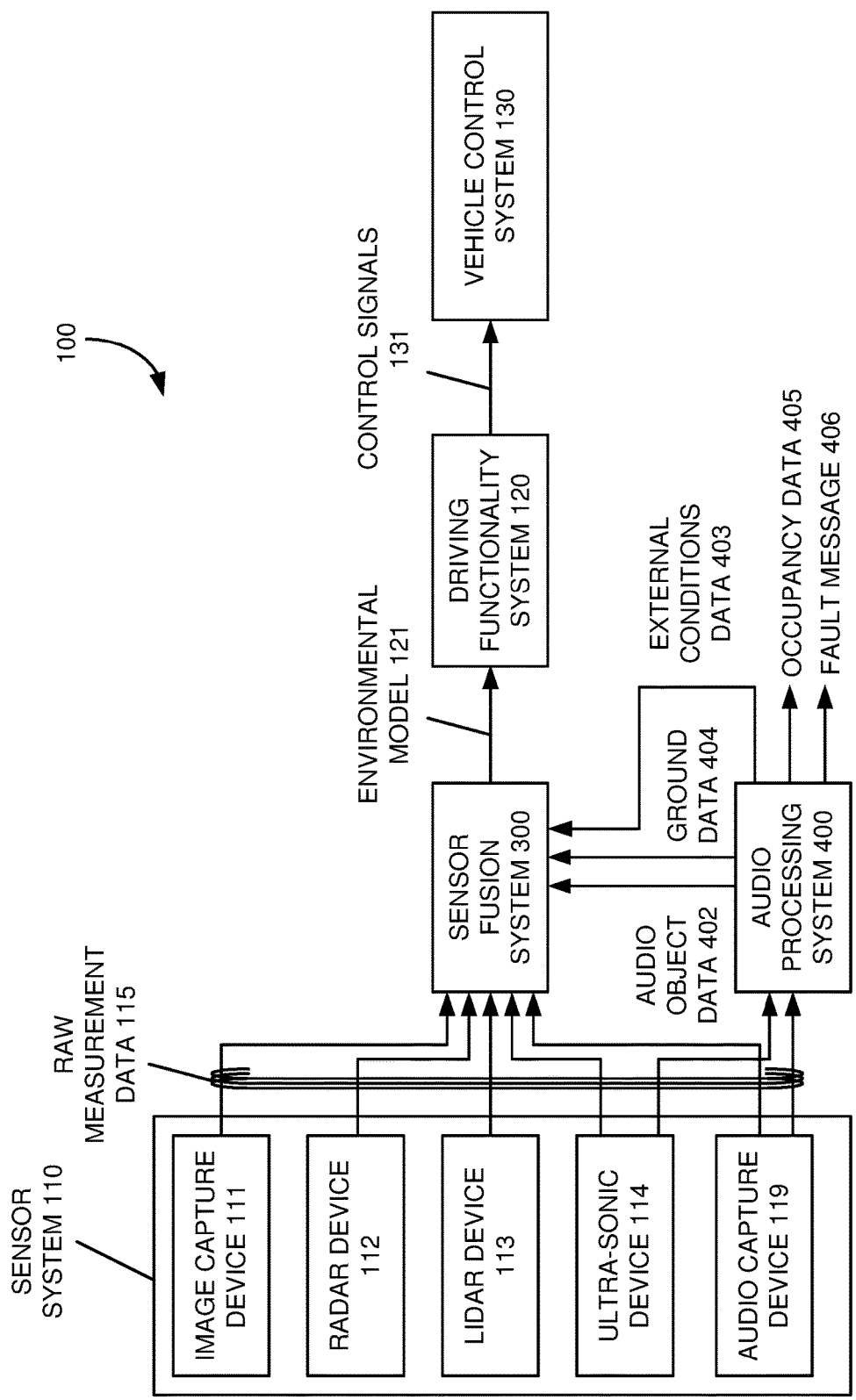
FIG. 1 illustrates an example autonomous driving system with audio perception according to various embodiments.

FIG. 1 illustrates an example autonomous driving system 100 according to various embodiments. Referring to FIG. 1, the autonomous driving system 100, when installed in a vehicle, can sense an environment surrounding the vehicle and control operation of the vehicle based, at least in part, on the sensed environment or interpreted environment.

The autonomous driving system 100 can include a sensor system 110 having multiple sensors, each of which can measure different portions or aspects of the environment surrounding the vehicle and output the measurements as raw measurement data 115. The raw measurement data 115 can include characteristics of light, electromagnetic waves, or sound captured by the sensors, such as an intensity or a frequency of the light, electromagnetic waves, or the sound, an angle of reception by the sensors, a time delay between a transmission and the corresponding reception of the light, electromagnetic waves, or the sound, a time of capture of the light, electromagnetic waves, or sound, or the like.

The sensor system 110 can include multiple different types of sensors, such as an image capture device 111, a Radio Detection and Ranging (Radar) device 112, a Light Detection and Ranging (Lidar) device 113, an ultra-sonic device 114, audio capture device 119, infrared or night-vision cameras, time-of-flight cameras, cameras capable of detecting and transmitting differences in pixel intensity, or the like. The image capture device 111, such as one or more cameras, can capture at least one image of at least a portion of the environment surrounding the vehicle. The image capture device 111 can output the captured image(s) as raw measurement data 115, which, in some embodiments, can be unprocessed and/or uncompressed pixel data corresponding to the captured image(s).

The radar device 112 can emit radio signals into the environment surrounding the vehicle. Since the emitted radio signals may reflect off of objects in the environment, the radar device 112 can detect the reflected radio signals incoming from the environment. The radar device 112 can measure the incoming radio signals by, for example, measuring a signal strength of the radio signals, a reception angle, a frequency, or the like. The radar device 112 can also measure a time delay between an emission of a radio signal and a measurement of the incoming radio signals from the environment that corresponds to emitted radio signals reflected off of objects in the environment. The radar device 112 can output the measurements of the incoming radio signals as the raw measurement data 115.

The lidar device 113 can transmit light, such as from a laser or other optical transmission device, into the environment surrounding the vehicle. The transmitted light, in some embodiments, can be pulses of visible light, near infrared light, or the like. Since the transmitted light can reflect off of objects in the environment, the lidar device 113 can include a photo detector to measure light incoming from the environment. The lidar device 113 can measure the incoming light by, for example, measuring an intensity of the light, a wavelength, or the like. The lidar device 113 can also measure a time delay between a transmission of a light pulse and a measurement of the light incoming from the environment that corresponds to the transmitted light having reflected off of objects in the environment. The lidar device 113 can output the measurements of the incoming light and the time delay as the raw measurement data 115.

The ultra-sonic device 114 can emit ultra-sonic pulses, for example, generated by transducers or the like, into the environment surrounding the vehicle. The ultra-sonic device 114 can detect ultra-sonic pulses incoming from the environment, such as, for example, the emitted ultra-sonic pulses having been reflected off of objects in the environment. The ultra-sonic device 114 can also measure a time delay between emission of the ultra-sonic pulses and reception of the ultra-sonic pulses from the environment that corresponds to the emitted ultra-sonic pulses having reflected off of objects in the environment. The ultra-sonic device 114 can output the measurements of the incoming ultra-sonic pulses and the time delay as the raw measurement data 115.

The audio capture device 119 can include a microphone or an array of microphones mounted to the vehicle, which can detect sound incoming from the environment, such as sounds generated from objects external to the vehicle, ambient naturally present sounds, sounds generated by the vehicle having been reflected off of objects in the environment, sounds generated by an interaction of the vehicle with the environment or other objects interacting with the environment, or the like. The audio capture device 119 can output the sounds measurements or captured audio as the raw measurement data 115.

Figure 2A:
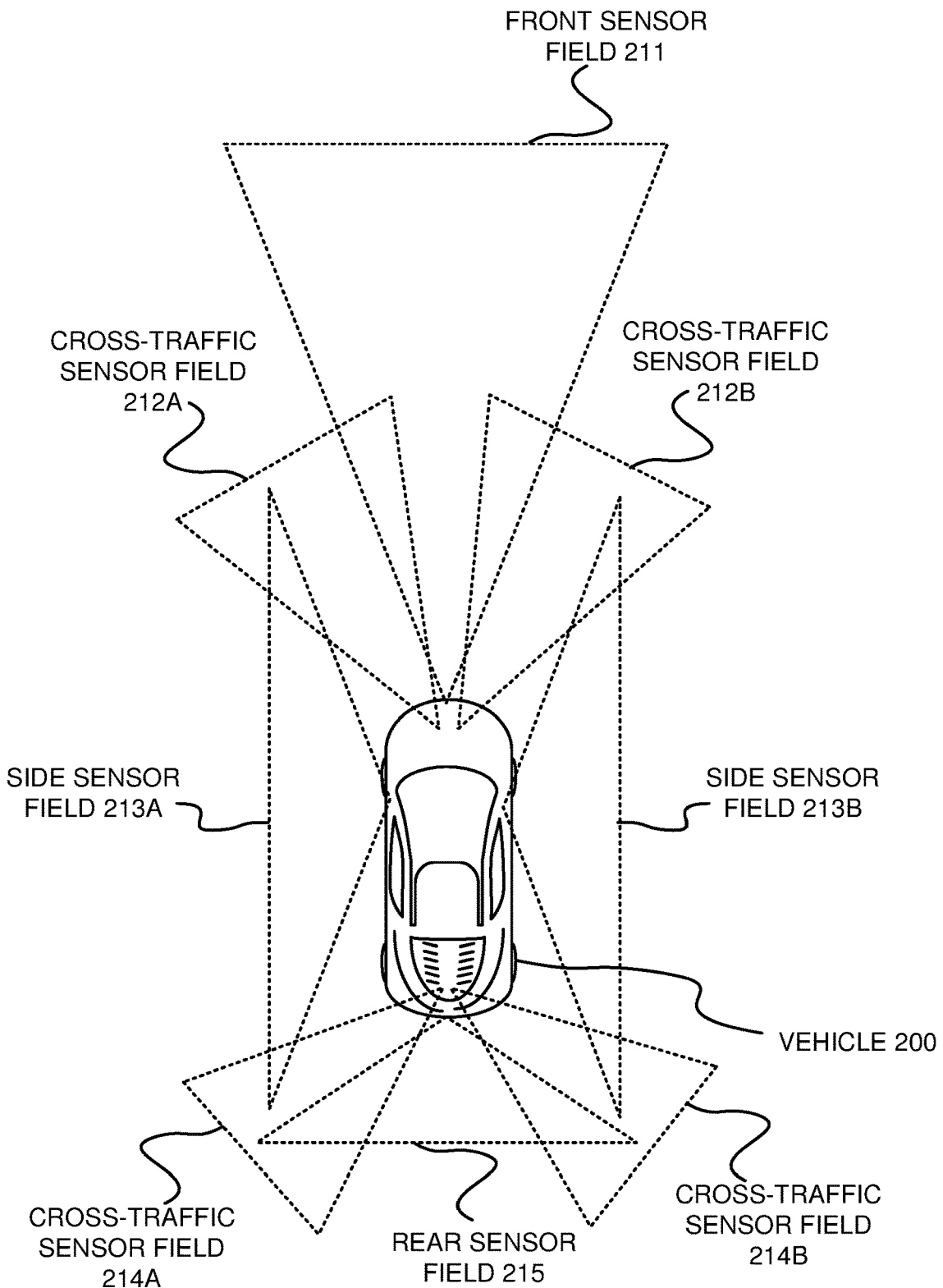
FIG. 2A illustrates an example measurement coordinate fields for a sensor system deployed in a vehicle according to various embodiments.

The different sensors in the sensor system 110 can be mounted to the vehicle to capture measurements for different portions of the environment surrounding the vehicle. FIG. 2A illustrates an example measurement coordinate fields for a sensor system deployed in a vehicle 200 according to various embodiments. Referring to FIG. 2A, the vehicle 200 can include multiple different sensors capable of detecting incoming signals, such as light signals, electromagnetic signals, and sound signals. Each of these different sensors can have a different field of view into an environment around the vehicle 200. These fields of view can allow the sensors to measure light and/or sound in different measurement coordinate fields.

The vehicle in this example includes several different measurement coordinate fields, including a front sensor field 211, multiple cross-traffic sensor fields 212A, 212B, 214A, and 214B, a pair of side sensor fields 213A and 213B, and a rear sensor field 215. Each of the measurement coordinate fields can be sensor-centric, meaning that the measurement coordinate fields can describe a coordinate region relative to a location of its corresponding sensor. In the case of audio capture devices, such as microphones, sound can be captured in with three-dimensional directionality, for example, from above, or below the audio caption design as well as from the sides of the vehicle or from inside the vehicle.

Referring back to FIG. 1, the autonomous driving system 100 can include a sensor fusion system 300 to receive the raw measurement data 115 from the sensor system 110 and populate an environmental model 121 associated with the vehicle with the raw measurement data 115. In some embodiments, the environmental model 121 can have an environmental coordinate field corresponding to a physical envelope surrounding the vehicle, and the sensor fusion system 300 can populate the environmental model 121 with the raw measurement data 115 based on the environmental coordinate field. In some embodiments, the environmental coordinate field can be a non-vehicle centric coordinate field, for example, a world coordinate system, a path-centric coordinate field, or the like.

Figure 2B:
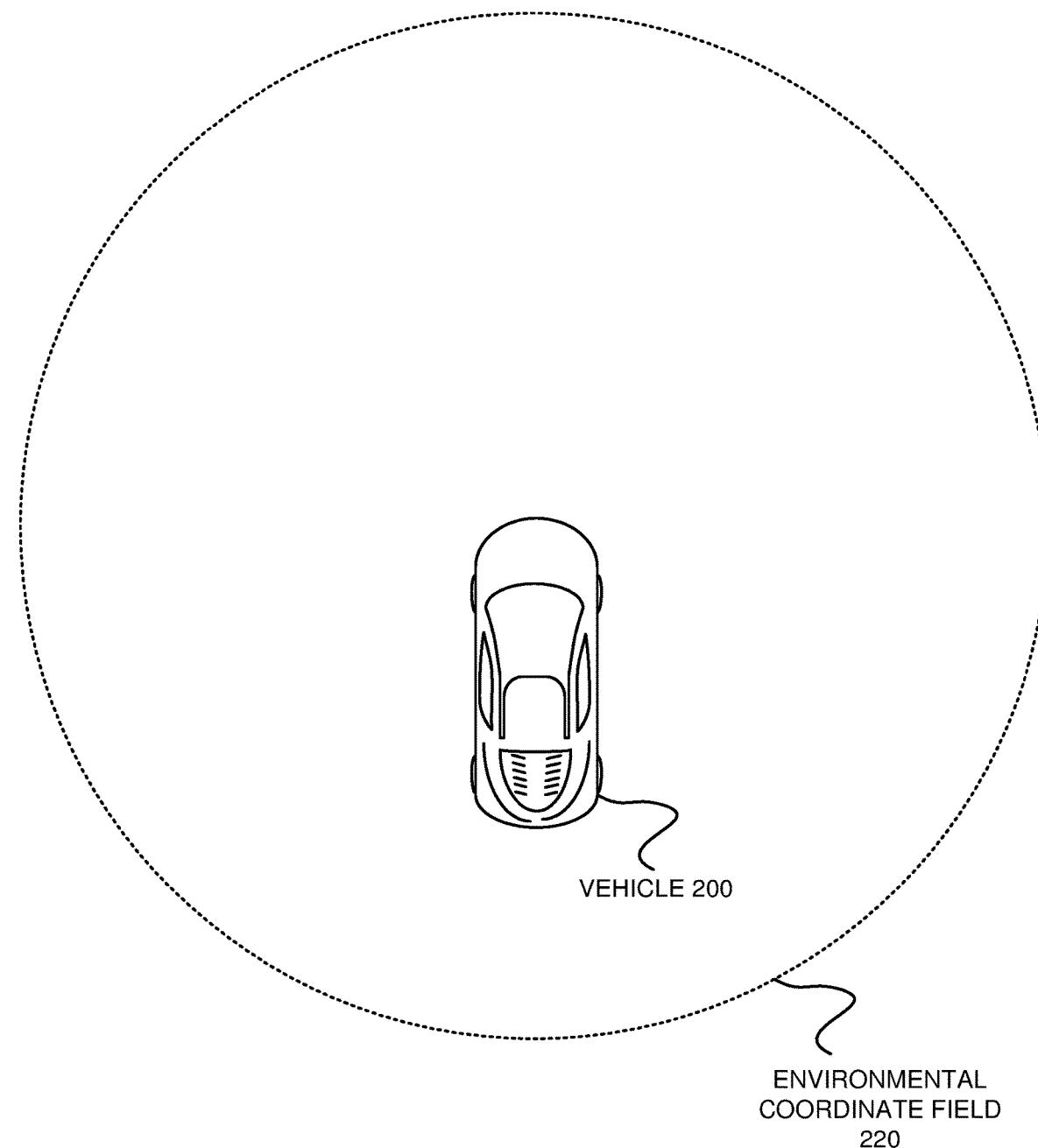
FIG. 2B illustrates an example environmental coordinate field associated with an environmental model for a vehicle according to various embodiments.

FIG. 2B illustrates an example environmental coordinate field 220 associated with an environmental model for the vehicle 200 according to various embodiments. Referring to FIG. 2B, an environment surrounding the vehicle 200 can correspond to the environmental coordinate field 220 for the environmental model. The environmental coordinate field 220 can be vehicle-centric and provide a 360 degree area around the vehicle 200, which can include a volume above and below portions of the 360 degree area, for example, a spherical geometry around the vehicle 200. The environmental model can be populated and annotated with information detected by the sensor fusion system 300 or inputted from external sources. Embodiments will be described below in greater detail.

Referring back to FIG. 1, to populate the raw measurement data 115 into the environmental model 121 associated with the vehicle, the sensor fusion system 300 can spatially align the raw measurement data 115 to the environmental coordinate field of the environmental model 121. The sensor fusion system 300 can also identify when the sensors captured the raw measurement data 115, for example, by time stamping the raw measurement data 115 when received from the sensor system 110. The sensor fusion system 300 can populate the environmental model 121 with the time stamp or other time-of-capture information, which can be utilized to temporally align the raw measurement data 115 in the environmental model 121.

The autonomous driving system 100 can include an audio processing system 400 to receive raw measurement data 115 corresponding to captured audio or sound, for example, from the audio capture device 119 and/or the ultra-sonic device 114 in the sensor system 110. The audio processing system 400 can generate audio object data 402 from the raw measurement data 115 corresponding to the captured audio and/or audio features derived from the captured audio. The audio object data 402 can describe a type of object that corresponds to the captured audio, a directionality of the captured audio relative to the vehicle, or the like.

In some embodiments, the audio processing system 400 can filter the captured audio to remove sounds or noise originating from the vehicle, sounds coming from particular directions, and/or corresponding to environmental conditions, such as road condition or weather. The audio processing system 400 can label portions of the captured audio to associate them with different types of objects capable of emitting the sounds. For example, the audio processing system 400 can compare the captured audio against pre-stored audio samples and/or derived audio features, and correlate a label of the pre-stored audio sample that matches with the captured audio. In some embodiments, the audio processing system 400 can utilize a machine-learning network, such as a convolutional neural network (CNN), Support Vector Machine (SVM), or the like, trained with labeled audio to determine object labels for capture audio input to the machine-learning network. The audio object data 402 can include the object labels output from the machine-learning network, which correlate the captured audio to the type of objects in the environment around the vehicle.

The audio processing system 400 can generate external conditions data 403 from the raw measurement data 115 corresponding to the captured audio. In some examples, the audio processing system 400 can detect weather conditions, such as rain, snow, ice, wind, or the like, based on the captured audio. The audio processing system 400 can also detect a condition of a roadway, such as gravel road, standing water, vibration caused by safety features added to the roadway, or the like, based on the captured audio. The audio processing system 400 may detect a type of infrastructure associated with a roadway, such as railroad crossing, tunnels, bridges, overpasses, or the like, based on the captured audio. The external conditions data 403 can include the weather conditions information, roadway conditions information, infrastructure information, or the like.

In some embodiments, the audio processing system 400 can identify sounds in the captured audio that originated from the vehicle and utilize identified sounds to generate ground data 404, occupancy data 405, a fault message 406, or the like. The ground data 404 can correspond to a reference to a location of the ground relative to the vehicle, for example, by determining a reflection of the sound emitted by the vehicle or its sensors and then utilizing the reflection to determine the reference to the ground. The occupancy data 405 can correspond to a presence of objects or free space relative to the vehicle, for example, by determining a reflection of the sound emitted by the vehicle or its sensors and then utilizing the reflection to determine the presence of objects or free space relative to the vehicle. In some examples, the occupancy data 405 can be utilized by a fault detection system (not shown) in the autonomous driving system 100 to confirm or cross-check whether the processing of the sensor fusion system 300 during the generation of the environmental model 121. The fault message 406 can correspond to an alert for the autonomous driving system 100 that the vehicle includes a mechanical fault, such as a flat tire, broken piston, engine friction, squeaky brakes, or the like.

The sensor fusion system 300 can populate the audio object data 402 into the environmental model 121. The sensor fusion system 300 can analyze the raw measurement data 115 from the multiple sensors as populated in the environmental model 121 and the audio object data 402 to detect a sensor event or at least one object in the environmental coordinate field associated with the vehicle. The sensor event can include a sensor measurement event corresponding to a presence of the raw measurement data 115 and/or audio object data 402 in the environmental model 121, for example, above a noise threshold. The sensor event can include a sensor detection event corresponding to a spatial and/or temporal grouping of the raw measurement data 115 and/or audio object data 402 in the environmental model 121. The object can correspond to spatial grouping of the raw measurement data 115 having been tracked in the environmental model 121 over a period of time, allowing the sensor fusion system 300 to determine the raw measurement data 115 corresponds to an object around the vehicle. The sensor fusion system 300 can populate the environment model 121 with an indication of the detected sensor event or detected object and a confidence level of the detection. Embodiments of sensor fusion and sensor event detection or object detection will be described below in greater detail.

The autonomous driving system 100 can include a driving functionality system 120 to receive at least a portion of the environmental model 121 from the sensor fusion system 300. The driving functionality system 120 can analyze the data included in the environmental model 121 to implement automated driving functionality or automated safety and assisted driving functionality for the vehicle. The driving functionality system 120 can generate control signals 131 based on the analysis of the environmental model 121.

The autonomous driving system 100 can include a vehicle control system 130 to receive the control signals 131 from the driving functionality system 120. The vehicle control system 130 can include mechanisms to control operation of the vehicle, for example by controlling different functions of the vehicle, such as braking, acceleration, steering, parking brake, transmission, user interfaces, warning systems, or the like, in response to the control signals.

Figure 3:
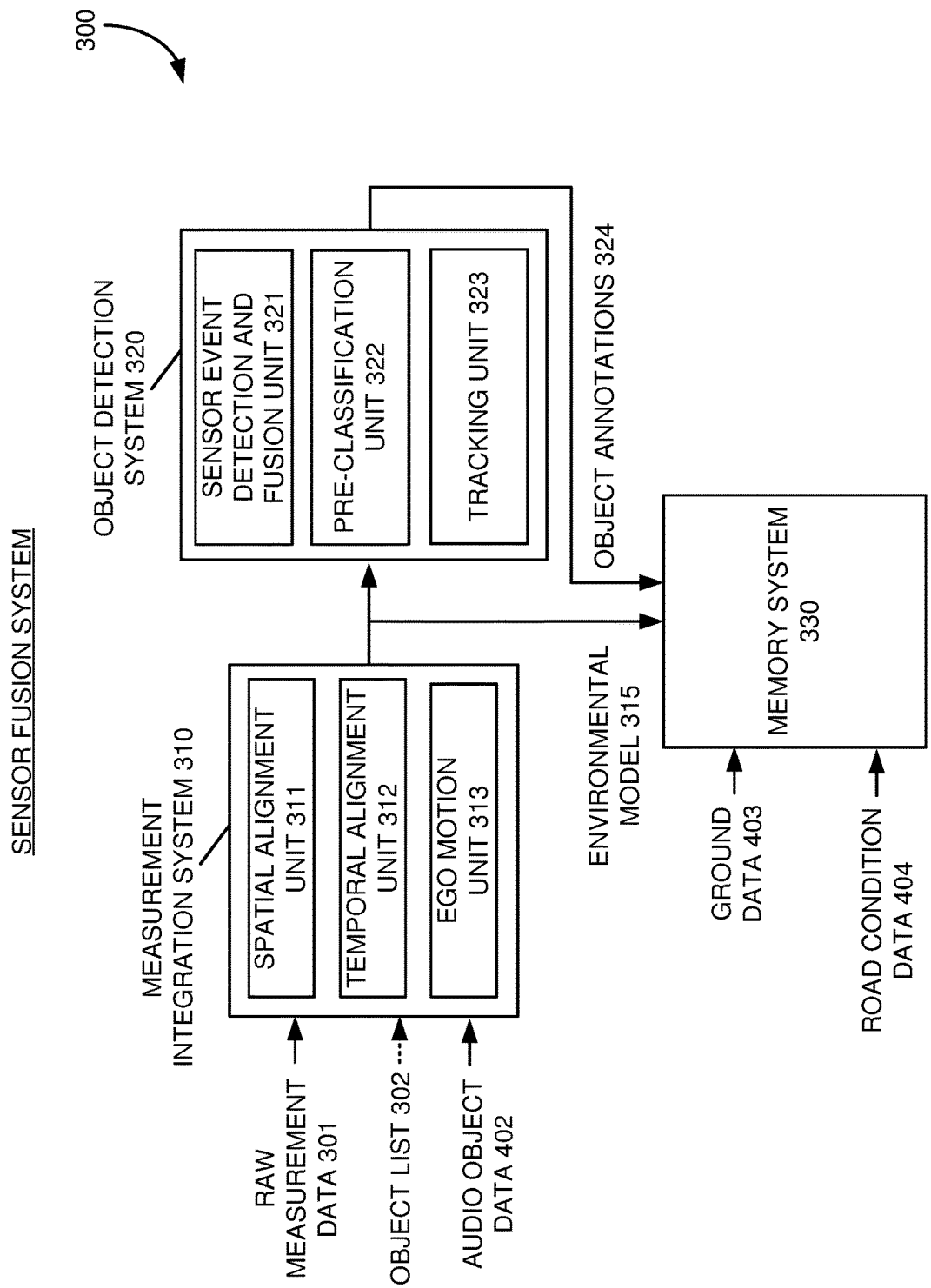
FIG. 3 illustrates an example sensor fusion system with captured audio according to various examples.

FIG. 3 illustrates an example sensor fusion system 300 according to various examples. Referring to FIG. 3, the sensor fusion system 300 can include a measurement integration system 310 to receive raw measurement data 301 from multiple sensors mounted to a vehicle and audio object data 402 from an audio processing system in the vehicle. The measurement integration system 310 can generate an environmental model 315 for the vehicle, which can be populated with the raw measurement data 301 and/or audio object data 402.

The measurement integration system 310 can include a spatial alignment unit 311 to correlate measurement coordinate fields of the sensors to an environmental coordinate field for the environmental model 315. The measurement integration system 310 can utilize this correlation to convert or translate locations for the raw measurement data 301 within the measurement coordinate fields into locations within the environmental coordinate field. The measurement integration system 310 can populate the environmental model 315 with the raw measurement data 301 based on the correlation between the measurement coordinate fields of the sensors to the environmental coordinate field for the environmental model 315.

The measurement integration system 310 can also temporally align the raw measurement data 301 from different sensors in the sensor system. In some embodiments, the measurement integration system 310 can include a temporal alignment unit 312 to assign time stamps to the raw measurement data 301 and/or audio object data 402 based on when the sensor captured the raw measurement data 301 and/or capture audio corresponding to the audio object data 402, when the raw measurement data 301 and/or audio object data 402 was received by the measurement integration system 310, or the like. In some embodiments, the temporal alignment unit 312 can convert a capture time of the raw measurement data 301 provided by the sensors into a time corresponding to the sensor fusion system 300. The measurement integration system 310 can annotate the raw measurement data 301 populated in the environmental model 315 with the time stamps for the raw measurement data 301. The time stamps for the raw measurement data 301 can be utilized by the sensor fusion system 300 to group the raw measurement data 301 in the environmental model 315 into different time periods or time slices. In some embodiments, a size or duration of the time periods or time slices can be based, at least in part, on a refresh rate of one or more sensors in the sensor system. For example, the sensor fusion system 300 can set a time slice to correspond to the sensor with a fastest rate of providing new raw measurement data 301 to the sensor fusion system 300.

The measurement integration system 310 can include an ego motion unit 313 to compensate for movement of at least one sensor capturing the raw measurement data 301, for example, due to the vehicle driving or moving in the environment. The ego motion unit 313 can estimate motion of the sensor capturing the raw measurement data 301, for example, by utilizing tracking functionality to analyze vehicle motion information, such as global positioning system (GPS) data, inertial measurements, vehicle odometer data, video images, or the like. The tracking functionality can implement a Kalman filter, a Particle filter, optical flow-based estimator, or the like, to track motion of the vehicle and its corresponding sensors relative to the environment surrounding the vehicle.

The ego motion unit 313 can utilize the estimated motion of the sensor to modify the correlation between the measurement coordinate field of the sensor to the environmental coordinate field for the environmental model 315. This compensation of the correlation can allow the measurement integration system 310 to populate the environmental model 315 with the raw measurement data 301 at locations of the environmental coordinate field where the raw measurement data 301 was captured as opposed to the current location of the sensor at the end of its measurement capture.

In some embodiments, the measurement integration system 310 may receive objects or object lists 302 from a variety of sources. The measurement integration system 310 can receive the object list 302 from sources external to the vehicle, such as in a vehicle-to-vehicle (V2V) communication, a vehicle-to-infrastructure (V2I) communication, a vehicle-to-pedestrian (V2P) communication, a vehicle-to-device (V2D) communication, a vehicle-to-grid (V2G) communication, or generally a vehicle-to-everything (V2X) communication. The measurement integration system 310 can also receive the objects or an object list 302 from other systems internal to the vehicle, such as from a human machine interface, mapping systems, localization system, driving functionality system, vehicle control system, or the vehicle may be equipped with at least one sensor that outputs the object list 302 rather than the raw measurement data 301.

The measurement integration system 310 can receive the object list 302 and populate one or more objects from the object list 302 into the environmental model 315 along with the raw measurement data 301. The object list 302 may include one or more objects, a time stamp for each object, and optionally include a spatial metadata associated with a location of objects in the object list 302. For example, the object list 302 can include speed measurements for the vehicle, which may not include a spatial component to be stored in the object list 302 as the spatial metadata. When the object list 302 includes a confidence level associated with an object in the object list 302, the measurement integration system 310 can also annotate the environmental model 315 with the confidence level for the object from the object list 302.

The sensor fusion system 300 can include an object detection system 320 to receive the environmental model 315 from the measurement integration system 310. In some embodiments, the sensor fusion system 300 can include a memory system 330 to store the environmental model 315 from the measurement integration system 310. The object detection system 320 may access the environmental model 315 from the memory system 330 as well as ground data 403 and road condition data 404.

The object detection system 320 can analyze data stored in the environmental model 315 to detect a sensor detection event or at least one object. The sensor fusion system 300 can populate the environment model 315 with an indication of the sensor detection event or detected object at a location in the environmental coordinate field corresponding to the detection. The sensor fusion system 300 can also identify a confidence level associated with the detection, which can be based on at least one of a quantity, a quality, or a sensor diversity of raw measurement data 301 and/or audio object data 402 utilized in detecting the sensor detection event or detected object. In some embodiments, the sensor fusion system 300 can utilize the audio object data 402 confirm a detection of a sensor detection event or object, and thus increase a confidence level of the detection. The sensor fusion system 300 can populate the environment model 315 with the confidence level associated with the detection. For example, the object detection system 320 can annotate the environmental model 315 with object annotations 324, which populates the environmental model 315 with the detected sensor detection event or detected object and corresponding confidence level of the detection.

The object detection system 320 can include a sensor event detection and fusion unit 321 to monitor the environmental model 315 to detect sensor measurement events. The sensor measurement events can identify locations in the environmental model 315 having been populated with the raw measurement data 301 and/or audio object data 402 for a sensor, for example, above a threshold corresponding to noise in the environment. In some embodiments, the sensor event detection and fusion unit 321 can detect the sensor measurement events by identifying changes in intensity within the raw measurement data 301 and/or audio object data 402 over time, changes in reflections within the raw measurement data 301 and/or audio object data 402 over time, change in pixel values, or the like.

The sensor event detection and fusion unit 321 can analyze the raw measurement data 301 and/or audio object data 402 in the environmental model 315 at the locations associated with the sensor measurement events to detect one or more sensor detection events. In some embodiments, the sensor event detection and fusion unit 321 can identify a sensor detection event when the raw measurement data 301 and/or the audio object data 402 associated with a single sensor meets or exceeds sensor event detection threshold. For example, when the audio object data 402 corresponds to a location not visible to the other sensors in the vehicle, the sensor event detection and fusion unit 321 can utilize to the audio object data 402 to identify a sensor detection event.

The sensor event detection and fusion unit 321, in some embodiments, can combine the identified sensor detection event for a single sensor with raw measurement data 301 and/or the audio object data 402 associated with one or more sensor measurement events or sensor detection events captured by at least another sensor to generate a fused sensor detection event. The fused sensor detection event can correspond to raw measurement data 301 from multiple sensors and/or the audio object data 402 from the audio processing system, at least one of which corresponds to the sensor detection event identified by the sensor event detection and fusion unit 321.

The object detection system 320 can include a pre-classification unit 322 to assign a pre-classification to the sensor detection event or the fused sensor detection event. In some embodiments, the pre-classification can correspond to a type of object, such as another vehicle, a pedestrian, a cyclist, an animal, a static object, or the like. When the sensor detection event or the fused sensor detection event was based on the audio object data 402, the pre-classification unit 322 can set the pre-classification to correspond to the label in the audio object data 402. For example, when the pre-classification unit 322 determines the type of object corresponds to an emergency vehicle, the pre-classification unit 322 can utilize any audio object data 402 corresponding to a siren originating near the emergency vehicle to confirm the pre-classification. In some embodiments, the pre-classification unit 322 can utilize the audio object data 402 to identify a state of an object. Using the emergency vehicle example, the pre-classification unit 322 can utilize the presence or absence of the siren in the audio object data 402 to classify the state of the emergency vehicle as either operating in an emergency response state or a normal vehicle state. The pre-classification unit 322 can annotate the environmental model 315 with the sensor detection event, the fused sensor detection event and/or the assigned pre-classification.

The object detection system 320 can also include a tracking unit 323 to track the sensor detection events or the fused sensor detection events in the environmental model 315 over time, for example, by analyzing the annotations in the environmental model 315, and determine whether the sensor detection event or the fused sensor detection event corresponds to an object in the environmental coordinate system. In some embodiments, the tracking unit 323 can track the sensor detection event or the fused sensor detection event utilizing at least one state change prediction model, such as a kinetic model, a probabilistic model, or other state change prediction model.

The tracking unit 323 can select the state change prediction model to utilize to track the sensor detection event or the fused sensor detection event based on the assigned pre-classification of the sensor detection event or the fused sensor detection event by the pre-classification unit 322. The state change prediction model may allow the tracking unit 323 to implement a state transition prediction, which can assume or predict future states of the sensor detection event or the fused sensor detection event, for example, based on a location of the sensor detection event or the fused sensor detection event in the environmental model 315, a prior movement of the sensor detection event or the fused sensor detection event, a classification of the sensor detection event or the fused sensor detection event, or the like. In some embodiments, for example, the tracking unit 323 implementing the kinetic model can utilize kinetic equations for velocity, acceleration, momentum, or the like, to assume or predict the future states of the sensor detection event or the fused sensor detection event based, at least in part, on its prior states. The tracking unit 323 may determine a difference between the predicted future state of the sensor detection event or the fused sensor detection event and its actual future state, which the tracking unit 323 may utilize to determine whether the sensor detection event or the fused sensor detection event is an object. After the sensor detection event or the fused sensor detection event has been identified by the pre-classification unit 322, the tracking unit 323 can track the sensor detection event or the fused sensor detection event in the environmental coordinate field associated with the environmental model 315, for example, across multiple different sensors and their corresponding measurement coordinate fields.

When the tracking unit 323, based on the tracking of the sensor detection event or the fused sensor detection event with the state change prediction model, determines the sensor detection event or the fused sensor detection event is an object, the object tracking unit 323 can annotate the environmental model 315 to indicate the presence of the object. The tracking unit 323 can continue tracking the detected object over time by implementing the state change prediction model for the object and analyzing the environmental model 315 when updated with additional raw measurement data 301. After the object has been detected, the tracking unit 323 can track the object in the environmental coordinate field associated with the environmental model 315, for example, across multiple different sensors and their corresponding measurement coordinate fields.

Figure 4:
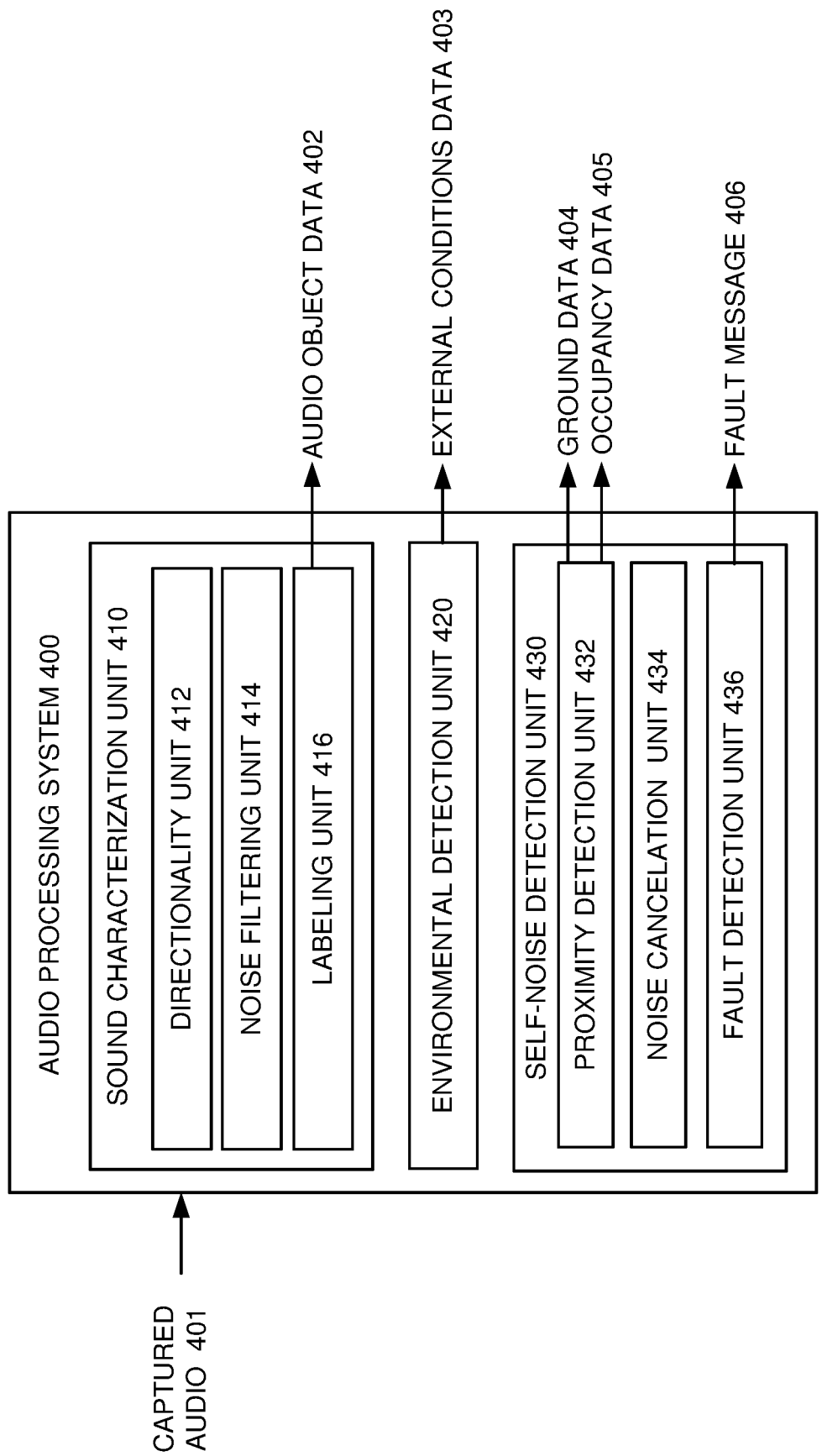
FIG. 4 illustrates an example audio processing system according to various examples.

FIG. 4 illustrates an example audio processing system 400 according to various examples. Referring to FIG. 4, the audio processing system 400 can receive captured audio 401 from a microphone or an array of microphones mounted to a vehicle, which can detect sound incoming from the environment, such as sounds generated from objects external to the vehicle, ambient naturally present sounds, sounds generated by the vehicle having been directly recorded and/or reflected off of objects in the environment.

The audio processing system 400 can include a sound characterization unit 410 to generate audio object data 402 from the captured audio 401. The audio object data 402 can describe a type of object that corresponds to the captured audio 401, a directionality of the captured audio 401 relative to the vehicle, or the like.

The sound characterization unit 410 can include a directionality unit 412 to determine a direction of the captured audio 401. In some embodiments, the directionality unit 412 can determine whether an object emitting the captured audio 401 was relatively moving towards or away from the vehicle, for example, utilizing the Doppler effect. The directionality unit 412 can also perform beamforming on the captured audio 401, for example by decomposing the captured audio 401 into plane-wave components having a directionality of propagation and/or by measuring the spatio-temporal gradient of the acoustic wave field. The sound characterization unit 410 can include a noise filtering unit 414 to filter the captured audio 401 to remove sounds or noise originating from the vehicle and/or corresponding to environmental conditions, such as road condition, infrastructure conditions, or weather conditions.

The sound characterization unit 410 can include a labeling unit 416 to identify a type of an object associated with the captured audio 401 and to generate the audio object data 402 that includes a label corresponding to the type of object associated with the captured audio 401. The labeling unit 416 can identify the label corresponding to the type of object associated with the captured audio 401 by comparing the captured audio 401 against pre-stored audio samples and/or derived audio features, for example, stored in a local memory device, and selecting a label of the pre-stored audio sample that matches with the captured audio. In some embodiments, the audio processing system 400 can utilize a machine-learning network, such as a convolutional neural network (CNN), Support Vector Machine (SVM), or the like, trained with labeled audio samples to determine the label for the captured audio 401. The machine-learning network can output a label corresponding to a type of object correlated to the captured audio 401.

Since directionality of sounds can indicate a subset of object types emitting sound associated with the captured audio 401, the labeling unit 416 may utilize the directionality of the captured audio 401 to guide the comparison of the captured audio against pre-stored audio samples. In some embodiments, the labeling unit 416 can request an external computing device perform the comparison, possibly external from the vehicle, and provide a label to the labeling unit 416 for use in generating the audio object data 402.

The audio processing system 400 can include an environmental detection unit 420 to generate external conditions data 403 from the captured audio 401. The external conditions data 403 can include weather conditions information, roadway conditions information, infrastructure information, or the like. The environmental detection unit 420 can compare the captured audio 401 to pre-stored audio samples of weather conditions information, roadway conditions information, infrastructure information, or the like, similar to the comparison performed by the labeling unit 416. The environmental detection unit 420 can detect weather conditions, such as rain, snow, ice, wind, or the like, based on the captured audio 401. The environmental detection unit 420 can also detect a condition of a roadway, such as gravel road, standing water, vibration caused by safety features added to the roadway, or the like, based on the captured audio. The environmental detection unit 420 may detect a type of infrastructure associated with a roadway, such as railroad crossing, tunnels, bridges, overpasses, or the like, based on the captured audio. The audio processing system 400 can provide the external conditions data 403 to other portions of the autonomous driving system for use in weighing other sensor data, to predict driving functionality, or the like.

The audio processing system 400 can include a self-noise detection unit 430 to identify sounds in the captured audio 401 that originated from the vehicle and utilize identified sounds to generate ground data 404, occupancy data 405, a fault message 406, or the like. The self-noise detection unit 430 can include a proximity detection unit 432 to utilize the sounds in the captured audio 401 that originated from the vehicle to determine a depth of objects or infrastructure from the vehicle. Since sounds emitted from the vehicle and their reflections off of objects and infrastructure in the environment around the vehicle can be captured by the microphones of the autonomous driving system, the proximity detection unit 432 can utilize a time delay between the initial sound and the reflection to determine a distance of the object or infrastructure from the microphones.

In some embodiments, the proximity detection unit 432 can determine the reflections of sound have a direction associated with the ground and utilize the distance of the ground relative to the microphones to generate ground data 404 that can label the ground. The proximity detection unit 432 can output the ground data 404 to the sensor fusion system in the autonomous driving system for use as a local reference for the fusion of raw measurement data and capture audio data 401.

The proximity detection unit 432 can also identify locations of objects relative to the vehicle based on the distance and directionality of the reflections of sound in the captured audio 401. The occupancy data 405 can correspond to a presence of objects or free space relative to the vehicle, for example, by determining a reflection of the sound emitted by the vehicle or its sensors and then utilizing the reflection to determine the presence of objects or free space relative to the vehicle. The proximity detection unit 432 can output the occupancy data 405, which the autonomous driving system can utilize in a safety cross-check against the objects populated in an environmental model. For example, when the occupancy data 405 conflicts with the environmental model regarding a presence of an object, the autonomous driving system can determine that a sensor fault or processing error may exist.

The self-noise detection unit 430 can include a noise cancelation unit 434 to utilize the sounds in the captured audio 401 that originated from the vehicle as an input into local noise cancelation system in the vehicle. For example, the vehicle can emit sounds inside the vehicle that cancel the sounds generated by the vehicle in the captured audio 401.

The self-noise detection unit 430 can include a fault detection unit 436 to compare the captured audio 401 against pre-stored audio samples corresponding to mechanical faults capable of occurring in the vehicle. For example, the pre-stored audio samples can correspond to a flat tire, broken piston, engine friction, squeaky brakes, or the like. When the fault detection unit 436 detects a match between the captured audio 401 against pre-stored audio sample corresponding to a mechanical fault, the fault detection unit 436 can generate a fault message 406 to identify the mechanical fault to the autonomous driving system. In some embodiments, the fault message 406 can include a label that can identify a type of fault, such as a flat tire, broken piston, engine friction, squeaky brakes, or the like, and a location of the fault in the vehicle. In some embodiments, the fault detection unit 436 can utilize a machine-learning network, such as a convolutional neural network (CNN), Support Vector Machine (SVM), or the like, trained with labeled audio samples to determine the label for the captured audio 401.

Figure 5:
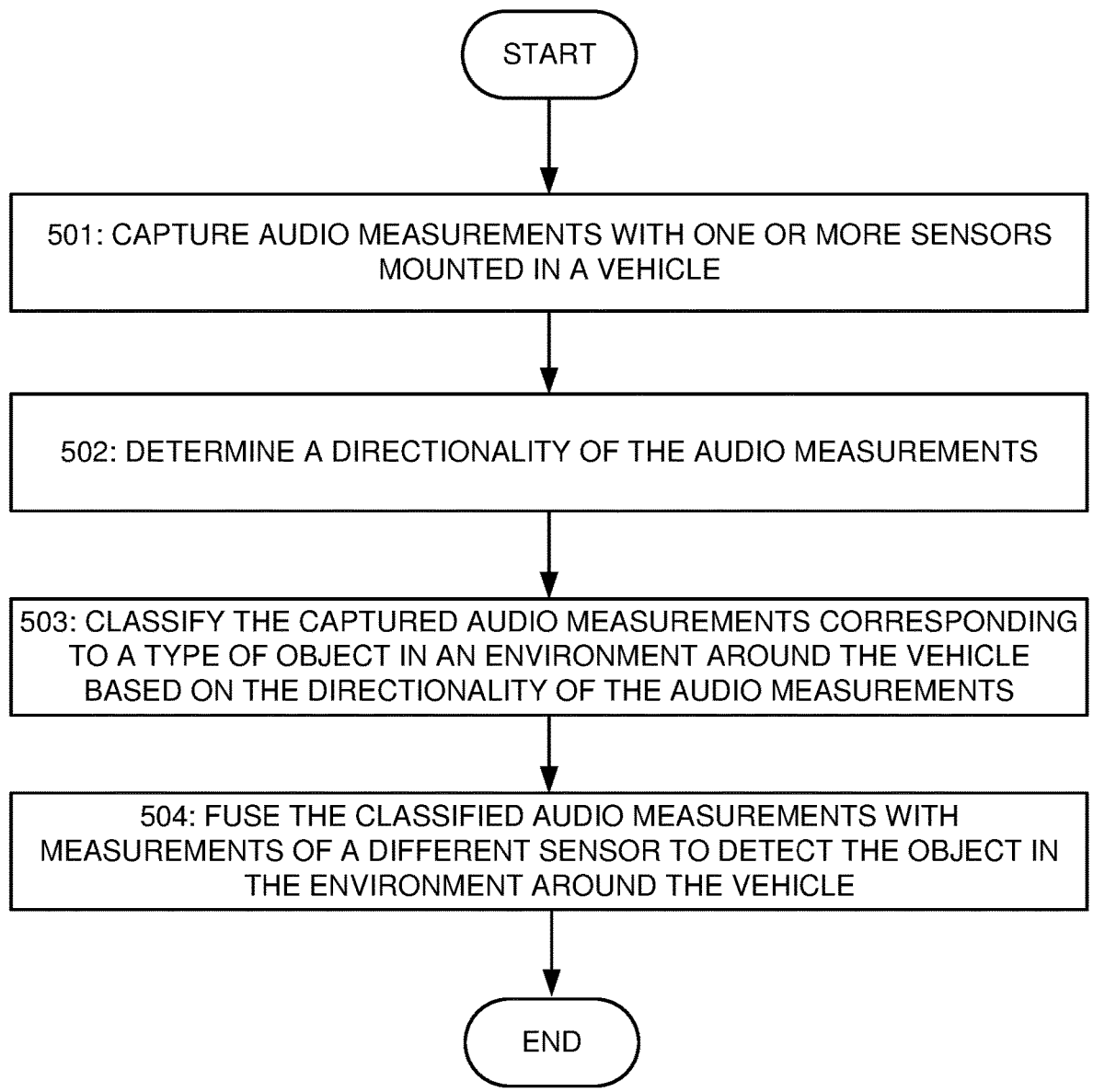
FIG. 5 illustrates an example flowchart for sensor fusion system with captured audio according to various examples.

FIG. 5 illustrates an example flowchart for sensor fusion with captured audio according to various examples. Referring to FIG. 5, in a block 501, one or more sensors mounted to a vehicle can capture audio measurements. The sensors can include a microphone or an array of microphones mounted to the vehicle, which can detect sound from the vehicle and sound incoming from the environment, such as sounds generated from objects external to the vehicle, ambient naturally present sounds, sounds generated by the vehicle having been reflected off of objects in the environment.

In a block 502, a computing system implementing sensor fusion with captured audio can determine a directionality of the audio measurements. In some embodiments, the directionality of the audio measurements can be whether an object emitting the sound was moving towards or away relative to the vehicle, for example, utilizing the Doppler effect. In some embodiments, the computing system can perform beamforming on the captured audio measurements, for example by decomposing the captured audio measurements into plane-wave components having a directionality of propagation and/or by measuring the spatio-temporal gradient of the acoustic wave field.

In a block 503, the computing system can classify the captured audio measurements as corresponding to a type of object in an environment around the vehicle based on the directionality of the audio measurements. The computing system can classify the captured audio measurements by comparing the captured audio measurements against pre-stored audio samples and then assigning an object type to the captured audio measurements based on any matches determined by the comparison. In some embodiments, the computing system can utilize a machine-learning network, such as a convolutional neural network (CNN), trained with labeled audio samples to determine the object type for the captured audio measurement. The machine-learning network can output the object type to assign to the captured audio measurements. Since directionality of sounds can indicate a subset of object types emitting sound associated with the captured audio measurements, the computing system may utilize the directionality of the captured audio measurements to guide the comparison of the captured audio against pre-stored audio samples.

In a block 504, the computing system can fuse the classified audio measurements with measurements of a different sensor to detect the object in the environment around the vehicle. In some embodiments, the computing system can fuse measurement data from different sensors and then utilize the classified audio measurements to increase a confidence level in the detected object. The computing system can utilize the classified audio measurements to determine a type of object tracking to implement, for example, a different kinetic model. The computing system can also utilize the classified audio measurements to focus processing concentration on specific data from a different sensor. For example, if the audio measurements were classified as corresponding to brakes in a vehicle, the computing system may focus processing resources to analyze captured image data corresponding to locations of brake lights in front of the vehicle.

Figure 6:
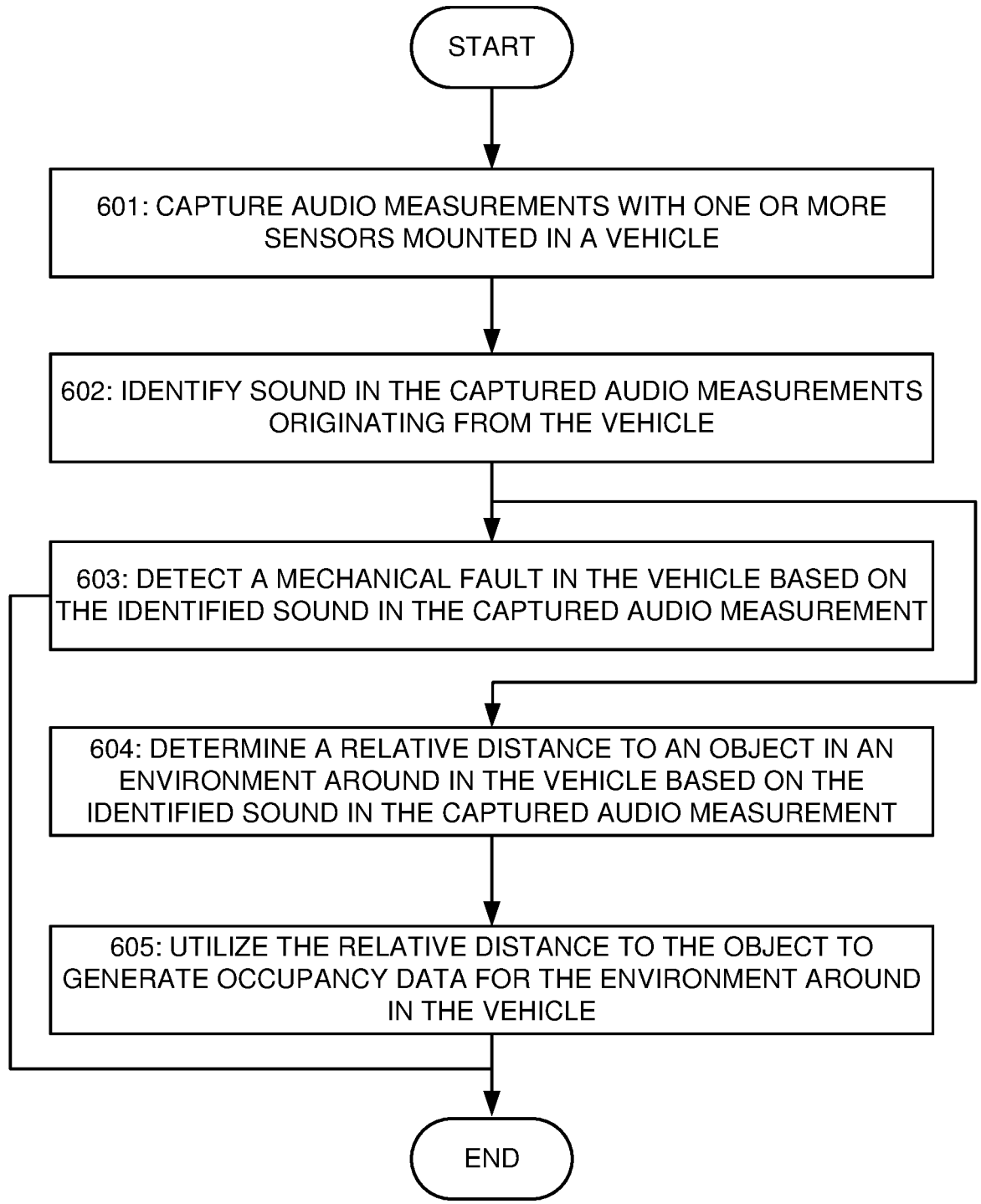
FIG. 6 illustrates an example flowchart for xxx according to various examples.

FIG. 6 illustrates an example flowchart for self-noise utilization according to various examples. Referring to FIG. 6, in a block 601, one or more sensors mounted to a vehicle can capture audio measurements. The sensors can include a microphone or an array of microphones mounted to the vehicle, which can detect sound from the vehicle and sound incoming from the environment, such as sounds generated from objects external to the vehicle, ambient naturally present sounds, sounds generated by the vehicle having been reflected off of objects in the environment.

In a block 602, a computing system implementing self-noise utilization can identify sound in the captured audio measurements originating from the vehicle. In some embodiments, the computing system can determine sound originated from the vehicle based on an intensity of the sound, detecting a reflection of the sound, correlating the sound to other operations of the vehicle, or the like. For example, when the vehicle accelerates or brakes and the computing system classifies captured sound as acceleration or braking, the computing system can determine that the classified sound originated from the vehicle. In another example, when the computing system classifies sound as a running engine and subsequently determines the sensors captured a reflection of the sound, the computing system can determine that the classified sound and its reflection originated from the vehicle.

In a block 603, the computing system can detect a mechanical fault in the vehicle based on the identified sound in the captured audio measurement. The computing system can classify the captured audio measurements originating from the vehicle by comparing the captured audio measurements against pre-stored audio samples. When the comparison indicates that the sound corresponds to a mechanical fault in the vehicle, the computing system can issue message alerting the autonomous driving system of a potential mechanical fault in the vehicle. In some embodiments, the computing system can utilize a machine-learning network, such as a convolutional neural network (CNN), Support Vector Machine (SVM), or the like, trained with labeled audio samples to determine the label for the captured audio measurements.

In a block 604, the computing system can determine a relative distance to an object in an environment around in the vehicle based on the identified sound in the captured audio measurement. Since sounds emitted from the vehicle and their reflections off of objects and infrastructure in the environment around the vehicle can be captured by the microphones of the autonomous driving system, the computing system can utilize a time delay between the initial sound and the reflection to determine a distance of the object or infrastructure from the microphones. In some embodiments, the computing system can determine the reflections of sound have a direction associated with the ground and utilize the distance of the ground relative to the microphones to label the ground for the autonomous driving system.

In a block 605, the computing system can utilize the relative distance to the object to generate occupancy data for the environment around in the vehicle. The computing system can identify the location of the object relative to the vehicle based on the distance and directionality of the reflections of sound in the captured audio. The occupancy data can correspond to a presence of objects or free space relative to the vehicle, for example, by determining a reflection of the sound emitted by the vehicle or its sensors and then utilizing the reflection to determine the presence of objects or free space relative to the vehicle. The autonomous driving system can utilize the occupancy data in a safety cross-check against the objects populated in an environmental model. For example, when the occupancy data conflicts with the environmental model regarding a presence of an object, the autonomous driving system can determine that a sensor fault or processing error may exist.

Illustrative Operating Environment

The execution of various low-level sensor fusion and driving automation processes according to embodiments may be implemented using computer-executable software instructions executed by one or more programmable computing devices. Because these embodiments may be implemented using software instructions, the components and operation of a programmable computer system on which various embodiments may be employed will be described below.

Figure 7:
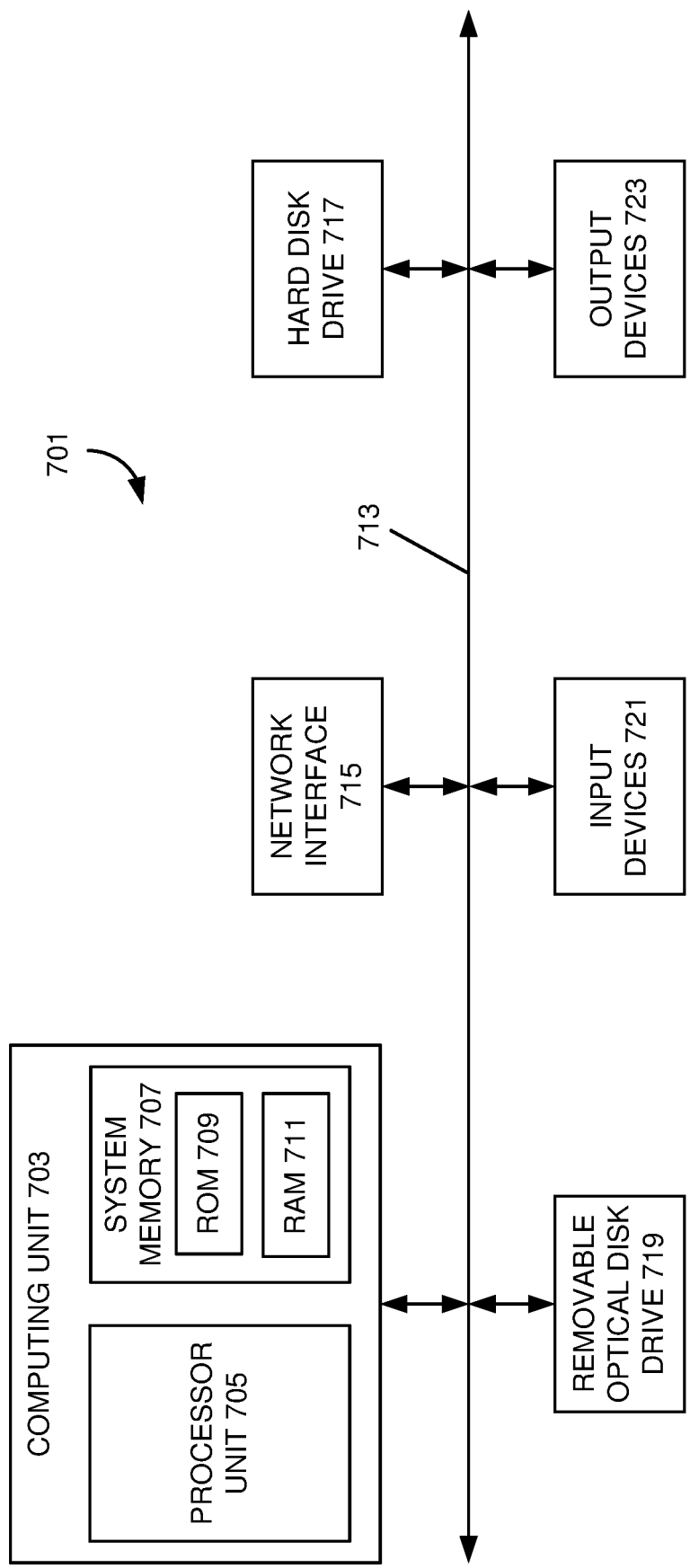
FIGS. 7 and 8 illustrate an example of a computer system of the type that may be used to implement various embodiments.
Figure 8:
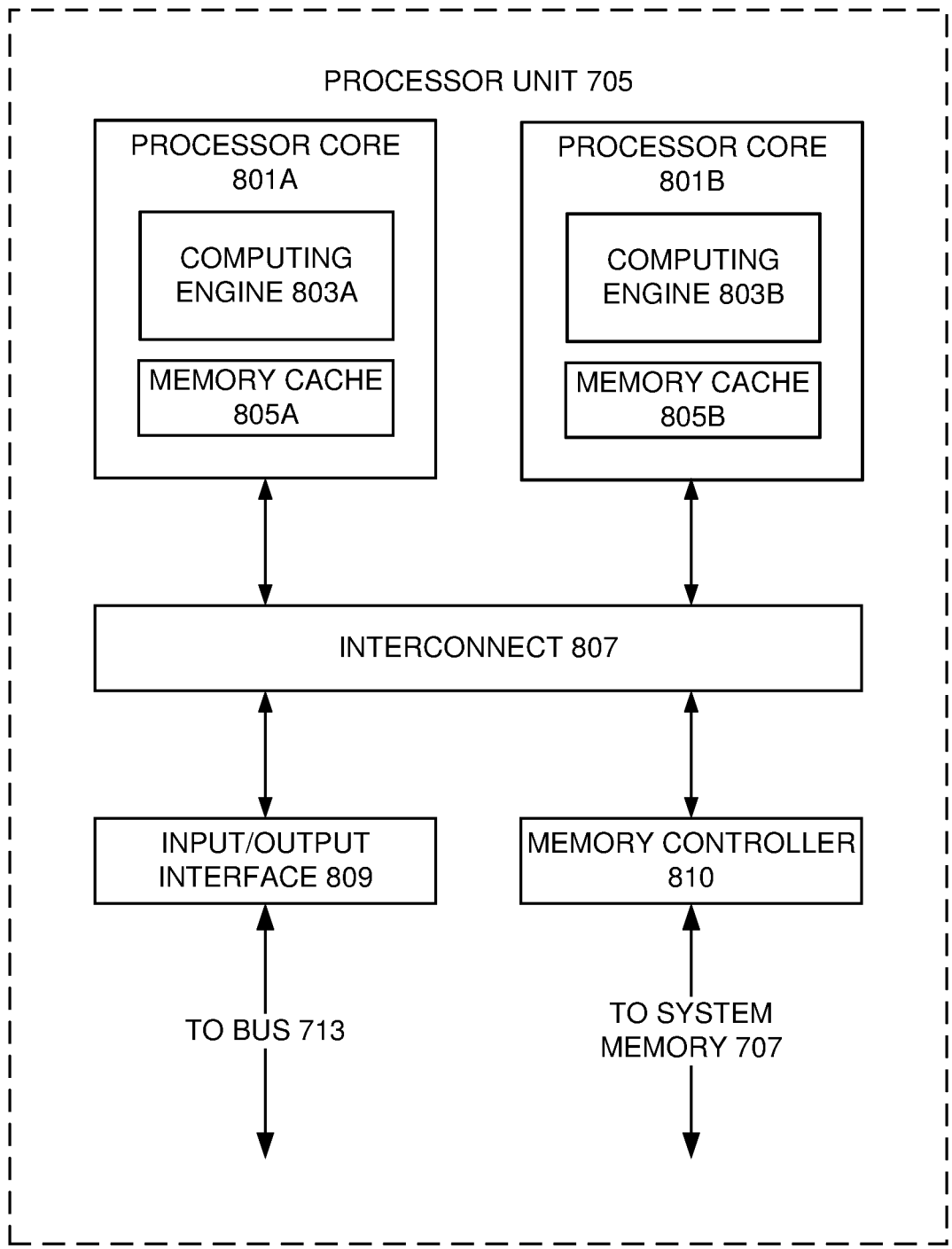

FIGS. 7 and 8 illustrate an example of a computer system of the type that may be used to implement various embodiments. Referring to FIG. 7, various examples may be implemented through the execution of software instructions by a computing device 701, such as a programmable computer. Accordingly, FIG. 7 shows an illustrative example of a computing device 701. As seen in FIG. 7, the computing device 701 includes a computing unit 703 with a processing unit 705 and a system memory 707. The processing unit 705 may be any type of programmable electronic device for executing software instructions, but will conventionally be a microprocessor. The system memory 707 may include both a read-only memory (ROM) 709 and a random access memory (RAM) 711. As will be appreciated by those of ordinary skill in the art, both the read-only memory (ROM) 709 and the random access memory (RAM) 711 may store software instructions for execution by the processing unit 705.

The processing unit 705 and the system memory 707 are connected, either directly or indirectly, through a bus 713 or alternate communication structure, to one or more peripheral devices 717-723. For example, the processing unit 705 or the system memory 707 may be directly or indirectly connected to one or more additional memory storage devices, such as a hard disk drive 717, which can be magnetic and/or removable, a removable optical disk drive 719, and/or a flash memory card. The processing unit 705 and the system memory 707 may also be directly or indirectly connected to one or more input devices 721 and one or more output devices 723. The input devices 721 may include, for example, a keyboard, a pointing device (such as a mouse, touchpad, stylus, trackball, or joystick), a scanner, a camera, and a microphone. The output devices 723 may include, for example, a monitor display, a printer and speakers. With various examples of the computing device 701, one or more of the peripheral devices 717-723 may be internally housed with the computing unit 703. Alternately, one or more of the peripheral devices 717-723 may be external to the housing for the computing unit 703 and connected to the bus 713 through, for example, a Universal Serial Bus (USB) connection.

With some implementations, the computing unit 703 may be directly or indirectly connected to a network interface 715 for communicating with other devices making up a network. The network interface 715 can translate data and control signals from the computing unit 703 into network messages according to one or more communication protocols, such as the transmission control protocol (TCP) and the Internet protocol (IP). Also, the network interface 715 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 701 is illustrated as an example only, and it not intended to be limiting. Various embodiments may be implemented using one or more computing devices that include the components of the computing device 701 illustrated in FIG. 7, which include only a subset of the components illustrated in FIG. 7, or which include an alternate combination of components, including components that are not shown in FIG. 7. For example, various embodiments may be implemented using a multi-processor computer, a plurality of single and/or multiprocessor computers arranged into a network, or some combination of both.

With some implementations, the processor unit 705 can have more than one processor core. Accordingly, FIG. 8 illustrates an example of a multi-core processor unit 705 that may be employed with various embodiments. As seen in this figure, the processor unit 705 includes a plurality of processor cores 801A and 801B. Each processor core 801A and 801B includes a computing engine 803A and 803B, respectively, and a memory cache 805A and 805B, respectively. As known to those of ordinary skill in the art, a computing engine 803A and 803B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 803A and 803B may then use its corresponding memory cache 805A and 805B, respectively, to quickly store and retrieve data and/or instructions for execution.

Each processor core 801A and 801B is connected to an interconnect 807. The particular construction of the interconnect 807 may vary depending upon the architecture of the processor unit 705. With some processor cores 801A and 801B, such as the Cell microprocessor created by Sony Corporation, Toshiba Corporation and IBM Corporation, the interconnect 807 may be implemented as an interconnect bus. With other processor units 801A and 801B, however, such as the Opteron™ and Athlon™ dual-core processors available from Advanced Micro Devices of Sunnyvale, Calif., the interconnect 807 may be implemented as a system request interface device. In any case, the processor cores 801A and 801B communicate through the interconnect 807 with an input/output interface 809 and a memory controller 810. The input/output interface 809 provides a communication interface between the processor unit 705 and the bus 713. Similarly, the memory controller 810 controls the exchange of information between the processor unit 705 and the system memory 707. With some implementations, the processor unit 705 may include additional components, such as a high-level cache memory accessible shared by the processor cores 801A and 801B. It also should be appreciated that the description of the computer network illustrated in FIG. 7 and FIG. 8 is provided as an example only, and it not intended to suggest any limitation as to the scope of use or functionality of alternate embodiments.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims. For example, while specific terminology has been employed above to refer to systems and processes, it should be appreciated that various examples of the invention may be implemented using any desired combination of systems and processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:
1. A method comprising:
capturing audio measurements with one or more sensors mounted to a vehicle;
classifying, by a computing system, the captured audio measurements as corresponding to a type of object in an environment around the vehicle; and
fusing, by the computing system, the classified audio measurements with measurements captured by at least one different type of sensor to detect the object in the environment around the vehicle, wherein a control system for the vehicle is configured to control operation of the vehicle based, at least in part, on the detected object, and wherein, when the type of object associated with the classified captured audio measurements is not visible to the at least one different type of the sensor, the control system for the vehicle is configured to control operation of the vehicle based, at least in part, on the type of object associated with the classified captured audio measurements.

2. The method of claim 1, further comprising:
identifying, by the computing system, noise in the captured audio measurements originating from the vehicle; and
filtering, by the computing system, the captured audio measurement to remove the noise, wherein the classifying utilizes the captured audio measurements having the noise removed.

3. The method of claim 1, further comprising:
identifying, by the computing system, noise in the captured audio measurements originating from the vehicle; and
utilizing, by the computing system, the noise in the captured audio measurement detect a fault in the vehicle.

4. The method of claim 1, further comprising utilizing, by the computing system, the captured audio measurements to detect external weather conditions, wherein the control system for the vehicle is configured to control operation of the vehicle based, at least in part, on the external weather conditions.

5. The method of claim 1, further comprising:
utilizing, by the computing system, the captured audio measurements to detect a proximity of the vehicle to the object in the environment; and
generating, by the computing system, occupancy data to identify areas in the environment around the vehicle corresponding to free space based, at least in part, on the detected proximity of the vehicle to the object in the environment.

6. The method of claim 1, further comprising utilizing, by the computing system, the captured audio measurements to detect a proximity of the vehicle to a ground in the environment, wherein the fusing of the classified audio measurements with measurements captured by at least one different type of sensor is performed relative to the detected proximity of the vehicle to the ground in the environment.

7. An apparatus comprising at least one memory device storing instructions configured to cause one or more processing devices to perform operations comprising:
classifying audio measurements captured with one or more sensors mounted to a vehicle, wherein the classified audio measurements identify to a type of object in an environment around the vehicle;
identifying noise in the captured audio measurements originating from the vehicle;
filtering the captured audio measurement to remove the noise, wherein the classifying utilizes the captured audio measurements having the noise removed; and
fusing the classified audio measurements with measurements captured by at least one different type of sensor to detect the object in the environment around the vehicle, wherein a control system for the vehicle is configured to control operation of the vehicle based, at least in part, on the detected object.

8. The apparatus of claim 7, wherein, when the type of object associated with the classified captured audio measurements is not visible to the at least one different type of the sensor, the control system for the vehicle is configured to control operation of the vehicle based, at least in part, on the type of object associated with the classified captured audio measurements.

9. The apparatus of claim 7, wherein the instructions are further configured to cause the one or more processing devices to perform operations comprising:
identifying noise in the captured audio measurements originating from the vehicle; and
utilizing the noise in the captured audio measurement detect a fault in the vehicle.

10. The apparatus of claim 7, wherein the instructions are further configured to cause the one or more processing devices to perform operations comprising utilizing the captured audio measurements to detect external weather conditions, wherein the control system for the vehicle is configured to control operation of the vehicle based, at least in part, on the external weather conditions.

11. The apparatus of claim 7, wherein the instructions are further configured to cause the one or more processing devices to perform operations comprising:
utilizing the captured audio measurements to detect a proximity of the vehicle to the object in the environment; and
generating occupancy data to identify areas in the environment around the vehicle corresponding to free space based, at least in part, on the detected proximity of the vehicle to the object in the environment.

12. The apparatus of claim 7, wherein the instructions are further configured to cause the one or more processing devices to perform operations comprising utilizing the captured audio measurements to detect a proximity of the vehicle to a ground in the environment, wherein the fusing of the classified audio measurements with measurements captured by at least one different type of sensor is performed relative to the detected proximity of the vehicle to the ground in the environment.

13. A system comprising:
a memory device configured to store machine-readable instructions; and
a computing system including one or more processing devices, in response to executing the machine-readable instructions, configured to:
classify audio measurements captured with one or more sensors mounted to a vehicle, wherein the classified audio measurements identify to a type of object in an environment around the vehicle;
utilize the captured audio measurements to detect a proximity of the vehicle to a ground in the environment; and
fuse the classified audio measurements with measurements captured by at least one different type of sensor relative to the detected proximity of the vehicle to the ground in the environment to detect the object in the environment around the vehicle, wherein a control system for the vehicle is configured to control operation of the vehicle based, at least in part, on the detected object.

14. The system of claim 13, wherein, when the type of object associated with the classified captured audio measurements is not visible to the at least one different type of the sensor, the control system for the vehicle is configured to control operation of the vehicle based, at least in part, on the type of object associated with the classified captured audio measurements.

15. The system of claim 13, wherein the one or more processing devices, in response to executing the machine-readable instructions, are configured to:
identify noise in the captured audio measurements originating from the vehicle; and
utilize the noise in the captured audio measurement detect a fault in the vehicle.

16. The system of claim 13, wherein the one or more processing devices, in response to executing the machine-readable instructions, are configured to utilize the captured audio measurements to detect external weather conditions, wherein the control system for the vehicle is configured to control operation of the vehicle based, at least in part, on the external weather conditions.

17. The system of claim 13, wherein the one or more processing devices, in response to executing the machine-readable instructions, are configured to:
utilize the captured audio measurements to detect a proximity of the vehicle to the object in the environment; and
generate occupancy data to identify areas in the environment around the vehicle corresponding to free space based, at least in part, on the detected proximity of the vehicle to the object in the environment.

* * * * *